United States Patent [19]

Daviot et al.

[11] 4,142,908

[45] Mar. 6, 1979

[54] REFRACTORY INSULATING PRODUCTS HAVING CONTROLLED POROSITY AND THE PREPARING THEREOF BY THE WET METHOD

[75] Inventors: Jean Daviot, Saint-Cheron; Michel Marchais, Orchies, both of France

[73] Assignee: Groupement pour les Activites Atomiques et Avancees, LePlessis-Robinson, France

[21] Appl. No.: 881,337

[22] Filed: Feb. 27, 1978

Related U.S. Application Data

[60] Continuation-in-part of Ser. No. 621,102, Oct. 9, 1975, abandoned, which is a division of Ser. No. 473,979, May 28, 1974, abandoned.

[30] Foreign Application Priority Data

May 30, 1973 [FR] France .................. 73 19773
Feb. 21, 1974 [FR] France .................. 74 05959

[51] Int. Cl.² ............................... C04B 7/34
[52] U.S. Cl. ...................... 106/64; 106/104
[58] Field of Search ................. 106/64, 99, 104

[56] References Cited

U.S. PATENT DOCUMENTS

| | | | |
|---|---|---|---|
| 3,164,482 | 1/1965 | Renkey | 106/64 |
| 3,269,849 | 8/1966 | Caprio et al. | 106/64 |
| 3,294,562 | 12/1966 | Caprio et al. | 106/64 |

*Primary Examiner*—James Poer
*Attorney, Agent, or Firm*—Sughrue, Rothwell, Mion, Zinn and Macpeak

[57] ABSTRACT

Refractory insulating products having controlled porosity, a high resistance to thermal shock, erosion and corrosion by liquid metals such as aluminium, obtained by the wet method, containing (a) an aluminous cement (b) a refractory aggregate, and (c) more than 10% by weight, in relation to the refractory aggregate, of polycrystalline ceramic fibers with at least 70% alumina and at most 30% silica.

5 Claims, No Drawings

REFRACTORY INSULATING PRODUCTS HAVING CONTROLLED POROSITY AND THE PREPARING THEREOF BY THE WET METHOD

This application is a continuation-in-part of application Ser. No. 621,102, filed Oct. 9, 1975, which is a division of original application Ser. No. 473,979, filed May 28, 1974, both now abandoned.

BACKGROUND OF THE INVENTION

1. Field of the Invention

The present invention concerns insulating refractory products having controlled porosity as well as the preparation thereof by the wet method.

2. Description of the Prior Art

It is known that the manufacturing of devices for casting, purifying and handling molten metals and more particularly corrosive molten metals such as aluminum, is conditioned by the perfectioning of refractory materials capable simutaneously of bearing the high temperature at which these molten metals are kept, of withstanding effectively their very corrosive action and lastly of bearing the thermal shocks to which the walls of these devices are subjected. During the last few years, various efforts have been made with a view to perfecting such materials. In general, these efforts have made it possible to obtain refractory products of the ceramic type which withstand well the aggressiveness of metals. But in numerous cases, these products are not very resistant to thermal shocks. Now, it is known that the resistance of a material to thermal shocks varies in an inverse proportion to the modulus of elasticity of the material, which itself depends directly on its porosity. It therefore appeared that a method enabling the controlling of the porosity of a refractory product during the manufacturing thereof gives the means of defining its resistance to thermal shocks.

Very recently, a process enabling the controlling of the porosity of a product of the type comprising ceramic substances obtained by sintering has been perfected. It consists more particularly in mixing a powder of oxides of Zirconium, Hafnium, Yttrium, Lanthanum, Beryllium and Calcium, with granulated substances resulting from the crushing of a dense sintered product obtained from these same powders, then in sintering that mixture at a relatively low temperature in a fluoride of a metal of group I of the periodic classification of elements. The porosity depends hence on the proportion of granulated products incorporated with the powder. The results obtained are very satisfactory but the method proves to be expensive and the industrial application thereof is probably fairly limited.

Moreover, processes using the wet process seemed not to have any future. Indeed, when concrete is made by the adding of a hydraulic binding agent, there is no mastery of the porosity obtained. By vibrating the product placed in a mould for a more or less long period, the porosity thereof may at the most be decreased but not increased.

Indeed, processes for manufacturing refractory products formed by mixing in a stirring machine products such as tabular alumina and aluminous cement by the damp method are known, but in these known methods, the product thus obtained is fired at a temperature in the order of 1700° C., leading to a great sintering of the product. That process therefore leads to a refractory ceramic substance which does not withstand well repeated thermal shocks.

Other manufacturing processes using the wet process, with the same refractory products and effecting the firing at lower temperatures, are also known, but in these processes, the sintering of the product is made easier by incorporating a flux such a bentonite which increases, indeed, the cohesion of the grains of the refractory product but which reduces, at the same time, the porosity of the finished product and, subsequently its resistance to thermal shocks, lastly, by the incorporating of the flux, a product having a poor resistance to erosion and corrosion by reactive metals such as aluminum is formed.

There were also proposed in U.S. Pat. Nos. 3,294,562 and 3,269,849 refractory compositions to be used in contact with molten nonferrous metals of melting points below about 1000° C., such as aluminium and aluminium base alloys, consisting essentially of 40 to 60% by weight of asbestos fibers, 30 to 20% by weight of calcium aluminate cement, 30 to 20% by weight of a fibrous material selected from the group consisting of fibrous alumina-silica which is refractory and substantially inert toward molten aluminium and fibrous potassium titanate, pressed under a high pressure and fired at temperatures from about 1400° F. to 2000° F. The disclosed alumina-silica fibers were either fibers with substantially equal amounts by weight of alumina and silica, such as the Fiberfrax and Kaowool fibers, or fibers of substantially pure silica, such as the Refrasil material. However, the asbestos fibers become brittle upon dehydration between 400° C. and 600° C., and the alumina-silica fibers have a high silica content and are therefore subject to corrosion by molten aluminium, which progressively reduces their silica content into silicium, and moreover such compositions have a relatively low resistance to fracture under thermal shock, so that they withstand a relatively low number of successive immersions into, and emersions from, molten aluminium, and cannot be used in devices to be submitted to contact with molten aluminum during long service periods, such as pumps for molten aluminum.

The search for refractory products simultaneously meeting the requirements of resistance to corrosion and erosion by molten aluminum and aluminum base alloys and of resistance to thermal shock, and capable, moreover, of being obtained on an industrial seale has led us to define a new product as refractory as ceramic substances but withstanding repeated thermal shocks and very long contact with molten aluminum.

SUMMARY OF THE INVENTION

The object of the invention is a refractory obtained by firing at a temperature below the sintering temperature a mixture of a refractory aluminous cement and of ceramic mixture of a) a refractory aggregate selected from the group consisting of tabular alumina, corindon, stabilized zirconia and calcium zirconate and b) refractory ceramic polycrystalline fibers comprising at least 70% alumina and at most 30% silica, the proportion of ceramic fibers being higher than 10% of the amount of refractory aggregate, and the proportion of the ceramic mixture being between 10 and 70% of the total mixture.

This product, having a low apparent density comprised between 1 and 1.6, and a porosity between 60% and 75%, is therefore very light. It is obviously much more porous than the ceramic substances obtained by sintering the same compounds; nevertheless, it is in the form of a strong solid substance having mechanical properties quite sufficient for making various devices for casting and pumping molten aluminum and aluminum base alloys. Due to its chemical constitution, it withstands the chemical action of molten aluminum as well as ceramic substances obtained by sintering of the same materials, but it has a very much greater resistance to repeated thermal shocks.

Moreover, the products thus obtained are excellent thermal insulants, since their coefficient of heat conduction lies between 0.1 and 0.5 Kcal/m/sq m/° C./hour.

Lastly, these products, although fired at a temperature lower than their sintering temperature, are nevertheless perfectly chemically and dimensionally stable.

The process described hereinbelow in its more general form is a wet process which makes possible to obtain these refractory products, using exclusively usual industrial products easily available in trade.

That process comprises the following operations:
forming a dry mixture of refractory aluminous cement and aggregate;
dry mixing the polycrystalline fibers with the mixture of refractory cement and aggregate, in such a ratio that the proportion of fibers is higher than 10% of the amount of aggregate;
dispersing the latter mixture in a certain quantity of water;
emulsifying the dispersed product by adding 0.5% to 3%, in relation to the weight of water, of a foaming agent stable in a medium of a pH greeter than 3, and a stabilizing agent;
casting and drying the product in a mould having lubricated walls;
firing the product thus obtained at a temperature below its sintering temperature.

The porosity of the final product is directly a function of the water/cement ratio. The proportion of water to be mixed to the dry cement-aggregate-fibers mixture is therefore to be strictly defined according to the porosity to be obtained.

The preparation of the intermediate emulsified product can also be effected by preparing separately the dry mixture cement-aggregate-fibers, and preparing on the other hand emulsified pure water, then dispersing the dry mixture in the emulsified water.

It can also be effected by adding simultaneously the components of the mixture into the water to which the foaming agent has been already added.

The refractory cement used basically consists of calcium aluminate.

The refractory aggregates to be used are, separately or in mixture, tabular alumina, corindon, stabilized zirconia or calcium zirconate. The refractory fibers preferably contain about 85% alumina and about 15% silica.

To obtain the foam in which the dispersing is effected, it is possible to take any foaming agent except these which are stable exclusively in a very acid medium (pH <3).

There can be used as stabilizing agent an organic product stable in an alkaline medium (pH 10) having a reticulated structure with large meshing, such as a soluble resin or a polysaccharide or a polysulphate.

DESCRIPTION OF THE PREFERRED EMBODIMENT

A dry mixture of polycrystalline fibers containing about 85% alumina and 14.5% silica, with minor amounts of iron sesquioride and sodium oxide, is formed with a previous mixture of refractory aluminous cement and tabular alumina. For instance, 8 kg of the aluminous cement Lafarge Secar 250 with 73% alumina and 27% calcium oxide, and 6 Kg of alumina type T60 passing through sieve 22 (US Standard 100 mesh), manufactured by Alcoa, are placed in a Moritz mixer. The mixing is continued for an hour 6 Kg of the refractory fibers manufactured by the French Company SEPR under the tradename Fibral are added, and the whole is mixed again for an hour.

The product obtained is placed in a Moritz turbo-milling machine, consisting of a closed enclosure of a capacity of 50 liters, provided with a blade rotating at a speed adjustable between 0 and 1000 rpm, having a double casing allowing the coaling of the mixture by a flow of water. 10 Kg of water are added, then 50g of foaming agent W53FL of Zimmer & Schwartz, and 20g of a stabilizing agent made up by a polysaccharide sold under the trade name "Zusoplatz PSI" by Zimmer & Schwartz.

The emulsion is obtained after 2 minutes. It is cast in a steel mold previously lubricated with Johnson No. 103 polish. Then, after 24 hours of setting, the article is stripped, dried and heated in a furnace in a damp atmosphere according to the following program.

Drying by heating from ambient temperature to 150° C. at a rate of 10° C. per hour with stages of 10 hours at 60° C., at 95° C. and of 20 hours at 150° C. After drying, firing by heating at a rate of 10° C. per hour up to 500° C., with a stage of 10 hours at 300° C., then heating at a rate of 50° C. per hour up to 800° C. The latter temperature is very much below the sintering temperature of the product.

The refractory product thus obtained has an apparent density of about 1.1 and a porosity of 72.5%. Its mechanical properties are the following:
Resistance to breaking: $\sigma = 40$ Kg/cm$^2$
Dilatation coefficient: $\alpha = 5.10^{-6}$
Young's modulus: $E = 2.10^5$ Kg/cm$^2$
so that the temperature difference above which fracture will occur as a result of thermal shock (Kingery, Introduction to Ceramics, 1960, p. 635–636)

$$Tf = k(\Sigma/\alpha \cdot E) = 0,4 \, k$$

That temperature difference is about 5 to 10 times higher than that obtained with a similar products with refractory fibers of about 50% by weight alumina and 50% silica.

Moreover, pumps for molten aluminum, with inner parts in contact with the molten aluminum made up with this refractory, have withstood 2000 hours of operation without any substantial crack or spalling, erosion or corrosion of the refractory.

The refractory products according to the invention are therefore highly valuable for equipment for treating molding and pumping corrosive molten metals such as aluminum, aluminum-base alloys, zinc and zinc-base alloys.

We claim:
1. A refractory product offering great stability to repeated thermal shocks and to corrosion and erosion by molten aluminum, having an apparent density of 1.1 to 1.6 and a thermal conductivity between 0.1 and 0.5 Kcal/sq m/m/° C./h, obtained by firing at a temperature below the sintering temperature a mixture of refractory aluminous cement and of a ceramic mixture of

(a) a refractory aggregate selected from the group consisting of tabular alumina, corindon, stabilized zirconia and calcium zirconate and (b) refractory ceramic polycrystalline fibers comprising at least 70% alumina and at most 30% silica, the proportion of ceramic fibers being higher than 10% of the amount of refractory aggregate, and the proportion of the ceramic mixture being between 10 and 70% of the total mixture.

2. A refractory product according to claim 1, wherein the refractory aggregate is tabular alumina.

3. A refractory product according to claim 2, wherein the refractory ceramic polycrystalline fibers comprise about 85% alumina and 15% silica.

4. A refractory product according to claim 3, wherein the refractory aluminous cement comprises at least 70% alumina, substantially all of the remainder being calcium oxide.

5. A refractory product according to claim 1, wherein the refractory aluminous cement comprises at least 70% alumina, substantially all of remainder being calcium oxide.

* * * * *